United States Patent
Chen et al.

(10) Patent No.: US 10,873,760 B2
(45) Date of Patent: Dec. 22, 2020

(54) MOTION VECTOR (MV) CONSTRAINTS AND TRANSFORMATION CONSTRAINTS IN VIDEO CODING

(71) Applicant: Futurewei Technologies, Inc., Plano, TX (US)

(72) Inventors: Huanbang Chen, Shenzhen (CN); Haitao Yang, Shenzhen (CN); Jianle Chen, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/944,501

(22) Filed: Apr. 3, 2018

(65) Prior Publication Data

US 2018/0295381 A1 Oct. 11, 2018

Related U.S. Application Data

(60) Provisional application No. 62/483,196, filed on Apr. 7, 2017, provisional application No. 62/616,263, filed on Jan. 11, 2018.

(51) Int. Cl.
*H04N 19/55* (2014.01)
*H04N 19/52* (2014.01)
(Continued)

(52) U.S. Cl.
CPC ........... *H04N 19/55* (2014.11); *H04N 19/105* (2014.11); *H04N 19/176* (2014.11); *H04N 19/52* (2014.11); *H04N 19/521* (2014.11)

(58) Field of Classification Search
None
See application file for complete search history.

(56) References Cited

U.S. PATENT DOCUMENTS

| 6,389,071 B1 | 5/2002 | Wilson |
| 2012/0128071 A1 | 5/2012 | Celetto et al. |

(Continued)

FOREIGN PATENT DOCUMENTS

| CN | 102917197 A | 2/2013 |
| KR | 20140095607 A | 8/2014 |

OTHER PUBLICATIONS

Foreign Communication From a Counterpart Application, PCT Application No. PCT/CN2018/082114, English Translation of International Search Report dated May 24, 2018, 5 pages.

(Continued)

*Primary Examiner* — Christopher G Findley
(74) *Attorney, Agent, or Firm* — Conley Rose, P.C.

(57) ABSTRACT

An apparatus comprises: a memory; and a processor coupled to the memory and configured to: obtain candidate MVs corresponding to neighboring blocks that neighbor a current block in a video frame, generate a candidate list of the candidate MVs, select final MVs from the candidate list, and apply constraints to the final MVs or a transformation to obtain constrained MVs. An apparatus comprises: a memory; and a processor coupled to the memory and configured to: obtain candidate MVs corresponding to neighboring blocks that neighbor a current block in a video frame, generate a candidate list of the candidate MVs, apply constraints to the candidate MVs or a transformation to obtain constrained MVs, and select final MVs from the constrained MVs.

18 Claims, 8 Drawing Sheets

(51) Int. Cl.
*H04N 19/105* (2014.01)
*H04N 19/176* (2014.01)
*H04N 19/513* (2014.01)

(56) References Cited

U.S. PATENT DOCUMENTS

| | | | |
|---|---|---|---|
| 2013/0039426 A1 | 2/2013 | Helle et al. | |
| 2013/0101041 A1 | 4/2013 | Fishwick et al. | |
| 2014/0086328 A1 | 3/2014 | Chen et al. | |
| 2014/0205013 A1* | 7/2014 | Kim | H04N 19/176 375/240.16 |
| 2016/0227218 A1* | 8/2016 | Trudeau | H04N 19/52 |
| 2017/0332095 A1* | 11/2017 | Zou | H04N 19/124 |

OTHER PUBLICATIONS

Foreign Communication From a Counterpart Application, PCT Application No. PCT/CN2018/082114, English Translation of Written Opinion dated May 24, 2018, 4 pages.

"High Efficiency Video Coding," Series H: Audiovisual and Multimedia Systems—Infrastructure of Audiovisual Service—Coding of Moving Video, ITU-T H.265, Dec. 2016, 664 pages.

"Affine Transform Prediction for Next Generation Video Coding," Huawei Technologies Co., Ltd., International Telecommunication Union, Standardization Sector, COM xxx—C1016-E, Study Group 16, Contribution 1016, Oct. 2015, 11 pages.

Zhou, M., "More Results on Restriction on Vector Spread-out in 8x8 Partitioning Mode," Joint Video Team (JVT) of ISO/IEC MPEG and ITU-T VCEG (ISO/IEC JTC1/SC29/WG11 and ITU-T SG16 Q.6), No. JVT-E041, Oct. 18, 2002, XP030005456, 18 pages.

Chujoh, T., "AHG07: A restriction of motion vector for small PU size", Document: JCTVC-I0075, WG11 No. m24314, XP030111838, Apr. 16, 2012, 4 pages.

Sullivan, G., et al., "Overview of the High Efficiency Video Coding (HEVC) Standard", IEEE Transactions on Circuits and Systems for Video Technology, XP055045358, Jan. 1, 2012, pp. 1-19.

Huang, H., et al., "Control-Point Representation and Differential Coding Affine-Motion Compensation," IEEE Transactions on Circuits and Systems for Video Technology, vol. 23, No. 10, XP055548912, Oct. 1, 2013, pp. 1651-1660.

Foreign Communication From a Counterpart Application, European Application No. 18781096.5, Extended European Search Report dated Jan. 9, 2020, 11 pages.

* cited by examiner

(12) United States Patent

MOTION VECTOR (MV) CONSTRAINTS AND TRANSFORMATION CONSTRAINTS IN VIDEO CODING

CROSS-REFERENCE TO RELATED APPLICATIONS

This application claim priority to U.S. provisional patent application No. 62/483,196 filed on Apr. 7, 2017 by Futurewei Technologies, Inc. and titled "Constraints for Affine Motion Vectors" and U.S. provisional patent application No. 62/616,263 filed on Jan. 11, 2018 by Futurewei Technologies, Inc. and titled "Constraints for Affine Memory Access," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Videos use a relatively large amount of data, so communication of videos uses a relatively large amount of bandwidth. However, many networks operate at or near their bandwidth capacities. In addition, customers demand high video qualities, which require using even more data. There is therefore a desire to both reduce the amount of data videos use and improve the video qualities. One solution is to compress videos during an encoding process and decompress the videos during a decoding process. Improving compression and decompression techniques is a focus of research and development.

SUMMARY

In one embodiment, the disclosure includes an apparatus comprising: a memory; and a processor coupled to the memory and configured to: obtain candidate MVs corresponding to neighboring blocks that neighbor a current block in a video frame, generate a candidate list of the candidate MVs, select final MVs from the candidate list, and apply constraints to the final MVs or a transformation to obtain constrained MVs. In some embodiments, the constraints provide that a first absolute value of a first difference between a first final MV and a second final MV is less than or equal to a first quantity based on a width of the current block and a threshold, and wherein the constraints further provide that a second absolute value of a second difference between a third final MV and a fourth final MV is less than or equal to a second quantity based on a height of the current block and the threshold; the constraints provide that a first square root of a first quantity is less than or equal to a second quantity, wherein the first quantity is based on a first final MV, a second final MV, a third final MV, a fourth final MV, and a width of the current block, and wherein the second quantity is based on the width and a threshold; the constraints further provide that a second square root of a third quantity is less than or equal to a fourth quantity, wherein the third quantity is based on a fifth final MV, a sixth final MV, a seventh final MV, an eighth final MV, and a height of the current block, and wherein the fourth quantity is based on the height and the threshold; the constraints provide that a first quantity is less than or equal to a second quantity, wherein the first quantity is based on a first width of a transformed block, a length of an interpolation filter, and a first height of the transformed block, and wherein the second quantity is based on a threshold, a second width of the current block, and a second height of the current block; the threshold is specific to uni-prediction or bi-prediction; the constraints provide that a quantity is less than or equal to a threshold, wherein the quantity is directly proportional to a first memory bandwidth and a second memory bandwidth, and wherein the quantity is indirectly proportional to a width of the current block and a height of the current block; the constraints provide that a first difference between a first width of a transformed block and a second width of the current block is less than or equal to a threshold, and wherein the constraints further provide that a second difference between a first height of the transformed block and a second height of the current block is less than or equal to the threshold; the processor is further configured to: calculate an MVF based on the constrained MVs; perform MCP based on the MVF to generate a prediction block for the current block; and encode an MV index; the processor is further configured to: decode an MV index; calculate an MVF based on the constrained MVs; and perform MCP based on the MVF to generate a prediction block for the current block.

In another embodiment, the disclosure includes a method comprising: obtaining candidate MVs corresponding to neighboring blocks that neighbor a current block in a video frame; generating a candidate list of the candidate MVs; selecting final MVs from the candidate list; and applying constraints to the final MVs or a transformation to obtain constrained MVs.

In yet another embodiment, the disclosure includes an apparatus comprising: a memory; and a processor coupled to the memory and configured to: obtain candidate MVs corresponding to neighboring blocks that neighbor a current block in a video frame, generate a candidate list of the candidate MVs, apply constraints to the candidate MVs or a transformation to obtain constrained MVs, and select final MVs from the constrained MVs. In some embodiments, the constraints provide that a first absolute value of a first difference between a first final MV and a second final MV is less than or equal to a first quantity based on a width of the current block and a threshold, and wherein the constraints further provide that a second absolute value of a second difference between a third final MV and a fourth final MV is less than or equal to a second quantity based on a height of the current block and the threshold; the constraints provide that a first square root of a first quantity is less than or equal to a second quantity, wherein the first quantity is based on a first final MV, a second final MV, a third final MV, a fourth final MV, and a width of the current block, and wherein the second quantity is based on the width and a threshold; the constraints further provide that a second square root of a third quantity is less than or equal to a fourth quantity, wherein the third quantity is based on a fifth final MV, a sixth final MV, a seventh final MV, an eighth final MV, and a height of the current block, and wherein the fourth quantity is based on the height and the threshold; the constraints provide that a first quantity is less than or equal to a second quantity, wherein the first quantity is based on a first width of a transformed block, a length of an interpolation filter, and a first height of the transformed block, and wherein the second quantity is based on a threshold, a second width of the current block, and a second height of the current block; the constraints provide that a quantity is less than or equal to a threshold, wherein the quantity is directly proportional to a first memory bandwidth and a second memory bandwidth, and wherein the quantity is indirectly proportional to a width of the current block and a height of the current block; the constraints provide that a first difference between a first width of a transformed block and a second width of the current block is less than or equal to a threshold, and wherein the constraints further provide that a second difference between a first height of the transformed block and a second height of the current block is less than or equal to the threshold; the processor is further configured to: calculate an MVF based on the constrained MVs; perform MCP based on the MVF to generate a prediction block for the current block; and encode an MV index; the processor is further configured to: decode an MV index; calculate an MVF based on the constrained MVs; and perform MCP based on the MVF to generate a prediction block for the current block.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
AF_inter: affine inter
AF_merge: affine merge
ASIC: application-specific integrated circuit
CPU: central processing unit
CTU: coding tree unit
DSP: digital signal processor
EO: electrical-to-optical
FPGA: field-programmable gate array
ITU: International Telecommunication Union
ITU-T: ITU Telecommunication Standardization Sector
LCD: liquid crystal display
MB: memory bandwidth
MCP: motion compensation prediction
MV: motion vector
MVF: motion vector field
NB: neighboring block
OE: optical-to-electrical
PPS: picture parameter set
RAM: random-access memory
RF: radio frequency
ROM: read-only memory
RX: receiver unit
SPS: sequence parameter set
SRAM: static RAM
TCAM: ternary content-addressable memory
TH: threshold
TX: transmitter unit.

Figure 1:
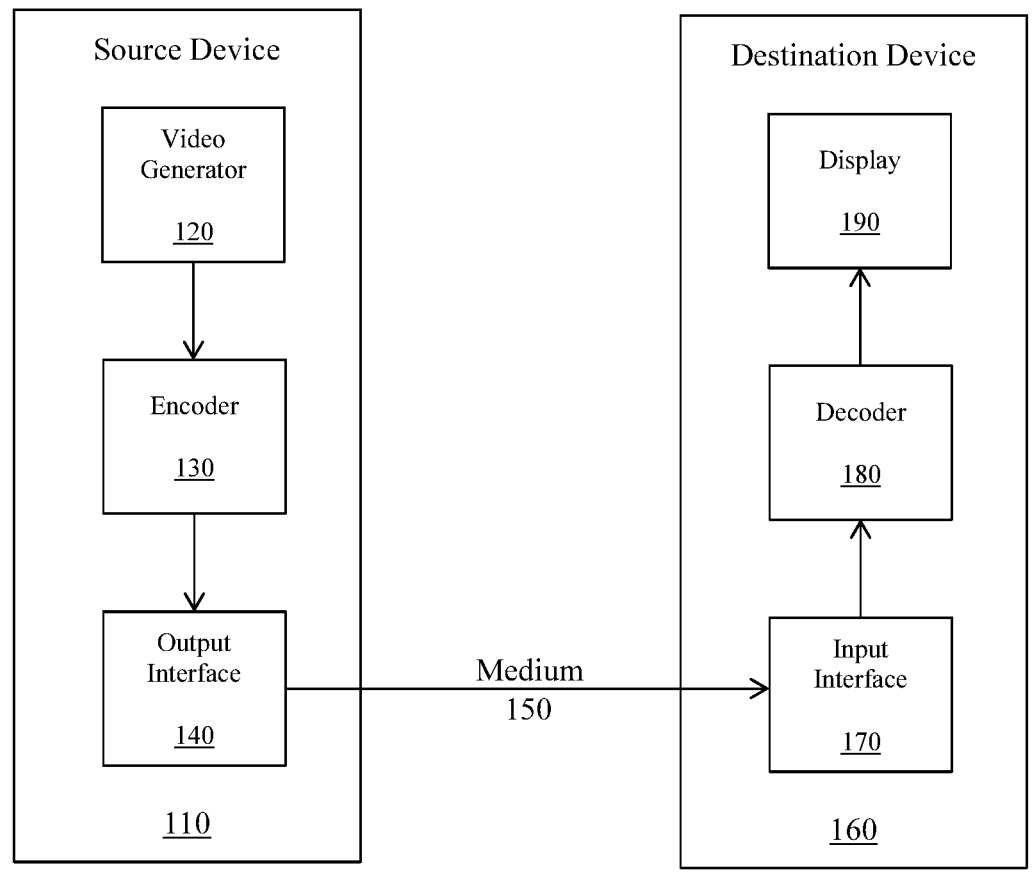
FIG. 1 is a schematic diagram of a coding system.

FIG. 1 is a schematic diagram of a coding system 100. The coding system 100 comprises a source device 110, a medium 150, and a destination device 160. The source device 110 and the destination device 160 are mobile phones, tablet computers, desktop computers, notebook computers, or other suitable devices. The medium 150 is a local network, a radio network, the Internet, or another suitable medium.

The source device 110 comprises a video generator 120, an encoder 130, and an output interface 140. The video generator 120 is a camera or another device suitable for generating video. The encoder 130 may be referred to as a codec. The encoder performs encoding according to a set of rules, for instance as described in "High Efficiency Video Coding," ITU-T H.265, December 2016 ("H.265"), which is incorporated by reference. The output interface 140 is an antenna or another component suitable for transmitting data to the destination device 160. Alternatively, the video generator 120, the encoder 130, and the output interface 140 are in any suitable combination of devices.

The destination device 160 comprises an input interface 170, a decoder 180, and a display 190. The input interface 170 is an antenna or another component suitable for receiving data from the source device 110. The decoder 180 may also be referred to as a codec. The decoder 180 performs decoding according to a set of rules, for instance as described in H.265. The display 190 is an LCD screen or another component suitable for displaying videos. Alternatively, the input interface 170, the decoder 180, and the display 190 are in any suitable combination of devices.

In operation, in the source device 110, the video generator 120 captures a video, the encoder 130 encodes the video to create an encoded video, and the output interface 140 transmits the encoded video over the medium 150 and towards the destination device 160. The source device 110 locally stores the video or the encoded video, or the source device 110 instructs storage of the video or the encoded video on another device. The encoded video comprises data defined at various levels, including slices and blocks. A slice is a spatially distinct region of a video frame that the encoder 130 encodes separately from any other region in the video frame. A block is a group of pixels arranged in a rectangle, for instance an 8 pixel×8 pixel square. Blocks are also referred to as units or coding units. Other levels include regions, CTUs, and tiles. In the destination device 160, the input interface 170 receives the encoded video from the source device 110, the decoder 180 decodes the encoded video to obtain a decoded video, and the display 190 displays the decoded video. The decoder 180 may decode the encoded video in a reverse manner compared to how the encoder 130 encodes the video. The destination device 160 locally stores the encoded video or the decoded video, or the destination device 160 instructs storage of the encoded video or the decoded video on another device.

Together, encoding and decoding are referred to as coding. Coding comprises intra coding and inter coding, which are also referred to as intra prediction and inter prediction, respectively. Intra prediction implements spatial prediction to reduce spatial redundancy within a video frame. Inter prediction implements temporal prediction to reduce temporal redundancy between successive video frames. One type of inter prediction is MCP.

"Affine transform prediction for next generation video coding," Huawei Technologies Co., Ltd., October 2015, which is incorporated by reference, describes AF_inter and AF_merge, which are two types of MCP coding modes that model affine transformation. In this context, affine transformation is transformation of a first video block or other unit to a second video block or other unit in a way that preserves lines and parallelism. Thus, AF_inter and AF_merge model translation, rotation, zooming, shear mapping, and other characteristics. However, both AF_inter and AF_merge increase a required memory bandwidth. Memory bandwidth is a rate at which data are read from or stored in memory and is typically measured in bytes per second. In this context, memory bandwidth may refer to a rate at which samples are read from memory during MCP encoding. Because AF_inter and AF_merge increase a required memory bandwidth, it is desirable to otherwise reduce that memory bandwidth.

Disclosed herein are embodiments for MV constraints and transformation constraints in video coding. The embodiments constrain MVs or transformations in order to reduce an amount of memory bandwidth required to perform AF_inter and AF_merge. The embodiments apply to transformations with two, three, four, or more control points. To implement the constraints, an encoder and a decoder apply thresholds. The encoder and the decoder store the thresholds as static defaults. Alternatively, the encoder dynamically signals the thresholds to the decoder in SPSs, PPSs, slice headers, or other suitable forms.

Figure 2:
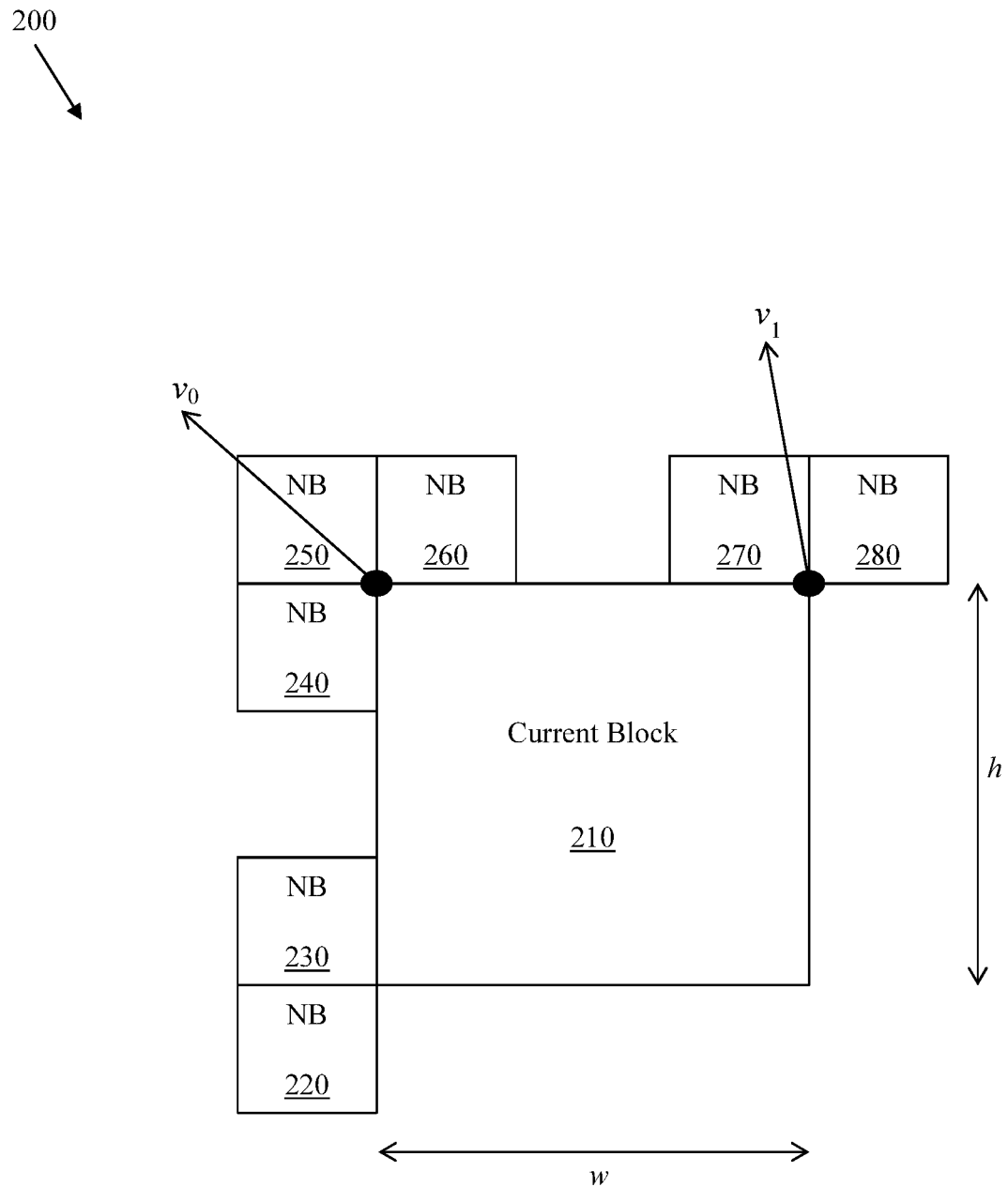
FIG. 2 is a schematic diagram illustrating MVs of a current block.

FIG. 2 is a schematic diagram 200 illustrating MVs of a current block. The schematic diagram 200 comprises a current block 210 and NBs 220, 230, 240, 250, 260, 270, 280. The current block 210 is called a current block because the encoder 130 is currently encoding it. The current block 210 comprises a width w; a height h; and a top-left control point and a top-right control point, which are indicated by black dots. w and h are, for instance, 8 pixels. The top-left control point has an MV $v_0$, which is represented as $(v_{0x}, v_{0y})$, where $v_{0x}$ is a horizontal component of $v_0$ and $v_{0y}$ is a vertical component of $v_0$. The top-right control point has an MV $v_1$, which is represented as $(v_{1x}, v_{1y})$, where $v_{1x}$ is a horizontal component of $v_1$ and $v_{1y}$ is a vertical component of $v_1$. The current block 210 may comprise additional control points, for instance a control point in a center of the current block 210. The NBs 220-280 are called NBs because they neighbor the current block 210.

For an affine model with two control points and four parameters, the MVF of the current block 210 is represented as follows:

$$v_x = \frac{v_{1x} - v_{0x}}{w}x - \frac{v_{1y} - v_{0y}}{w}y + v_{0x} \quad (1)$$

$$v_y = \frac{v_{1y} - v_{0y}}{w}x + \frac{v_{1x} - v_{0x}}{w}y + v_{0y}.$$

$v_x$ is a horizontal component of an MV of the entire current block 210; $v_{1x}$, $v_{0x}$, w, $v_{1y}$, and $v_{0y}$ are as described above; x is a horizontal position measured from the center of the current block 210; y is a vertical position measured from the center of the current block 210; and $v_y$ is a vertical component of the MV of the entire current block 210. For an affine model with three control points and six parameters, the MVF of the current block 210 is represented as follows:

$$v_x = \frac{v_{1x} - v_{0x}}{w}x + \frac{v_{2x} - v_{0x}}{h}y + v_{0x} \quad (2)$$

$$v_y = \frac{v_{1y} - v_{0y}}{w}x + \frac{v_{2y} - v_{0y}}{h}y + v_{0y}.$$

$v_x$, $v_{1x}$, $v_{0x}$, w, x, h, y, $v_y$, $v_{1y}$, and $v_{0y}$ are as described above; $v_{2x}$ is a horizontal component of a bottom-left control point MV; and $v_{2y}$ is a vertical component of the bottom-left control point MV. For an affine model with four control points and eight parameters, the MVF of the current block 210 is represented as follows:

$$v_x = \frac{v_{1x} - v_{0x}}{w}x + \frac{v_{2x} - v_{0x}}{h}y + \frac{v_{3x} + v_{0x} - v_{1x} - v_{2x}}{wh}y + v_{0x} \quad (3)$$

$$v_y = \frac{v_{1y} - v_{0y}}{w}x + \frac{v_{2y} - v_{0y}}{h}y + \frac{v_{3y} + v_{0y} - v_{1y} - v_{2y}}{wh}y + v_{0y}.$$

$v_x$, $v_{1x}$, $v_{0x}$, w, x, $v_{2x}$, h, y, $v_x$, $v_{1y}$, $v_{0y}$, and $v_{2y}$ are as described above; $v_{3x}$ is a horizontal component of a bottom-right control point MV; and $v_{3y}$ is a vertical component of the bottom-right control point MV.

Figure 3:
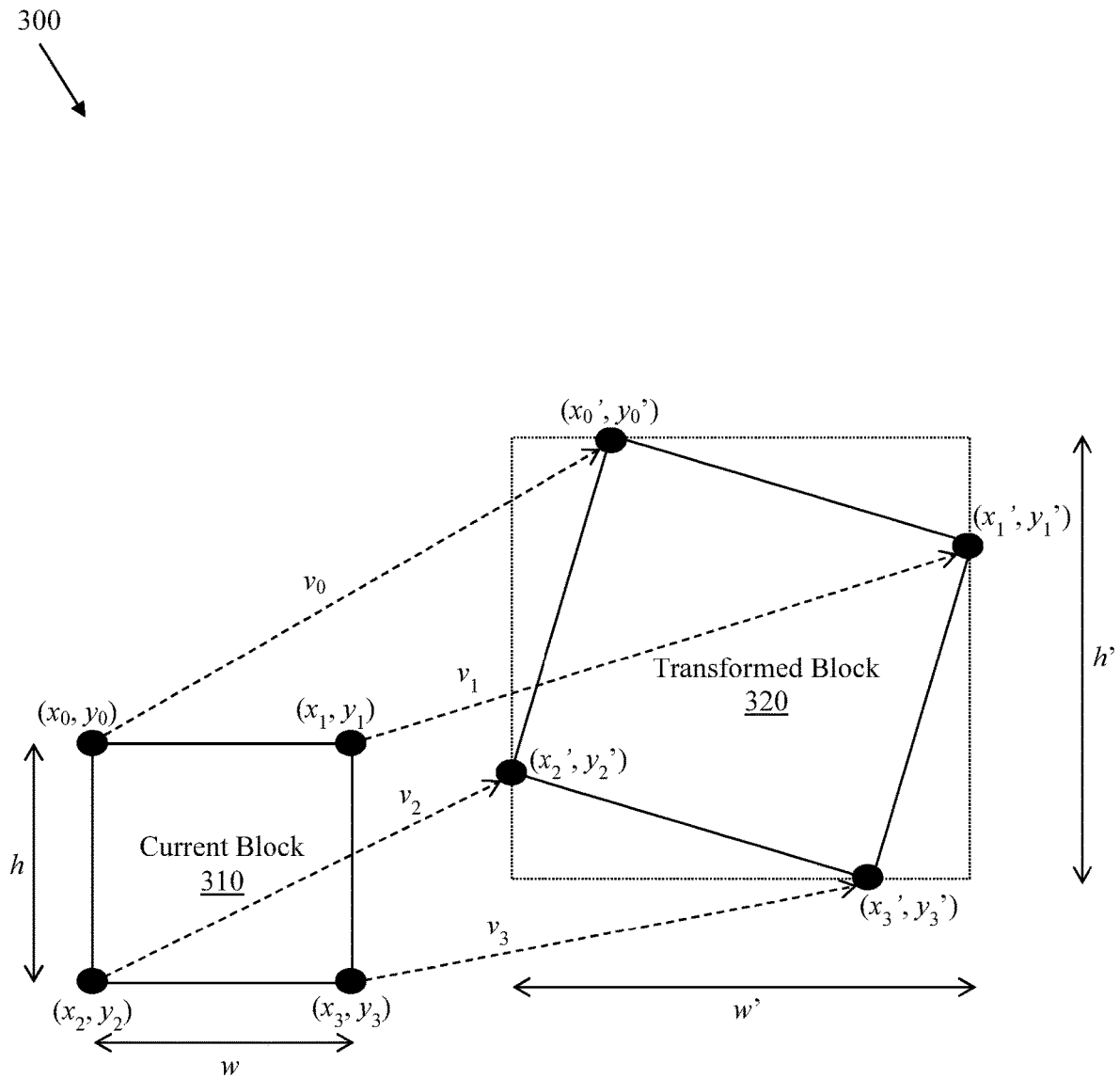
FIG. 3 is a schematic diagram illustrating transformation of a current block.

FIG. 3 is a schematic diagram 300 illustrating transformation of a current block. The schematic diagram 300 comprises a current block 310 and a transformed block 320. The current block 310 is in a current video frame, and the transformed block 320 is the current block 310 in an immediately succeeding video frame after undergoing a transformation. As shown, to transform from the current block 310 to the transformed block 320, the current block 310 undergoes both rotation and zooming.

In the current block 310, positions of a top-left control point, a top-right control point, a bottom-left control point, and a bottom-right control point in the current block 310 are represented as coordinate sets $(x_0, y_0)$, $(x_1, y_1)$, $(x_2, y_2)$, and $(x_3, y_3)$, respectively; w is a width; and h is a height. In the transformed block 320, positions of a top-left control point, a top-right control point, a bottom-left control point, and a bottom-right control point of the transformed block 320 are represented as coordinate sets $(x_0', y_0')$, $(x_1', y_1')$, $(x_2', y_2')$, and $(x_3', y_3')$, respectively; w' is a width; and h' is a height. A motion vector v is represented as a coordinate set $(v_0, v_1, v_2, v_3)$ and describes motion of the current block 310 to the transformed block 320. Thus, the control points of the transformed block 320 may be expressed in terms of the control points of the current block 310 and the motion vector v as follows:

$$(x_0', y_0') = (x_0 + vx_0, y_0 + vy_0)$$

$$(x_1', y_1') = (x_1 + vx_1, y_1 + vy_1)$$

$$(x_2', y_2') = (x_2 + vx_2, y_2 + vy_2)$$

$$(x_3', y_3') = (x_3 + vx_3, y_3 + vy_3). \quad (4)$$

The size of the transformed block 320 may be expressed as follows:

$$w'=\max(x_0',x_1',x_2',x_3')-\min(x_0',x_1',x_2',x_3')+1$$

$$h'=\max(y_0',y_1',y_2',y_3')-\min(y_0',y_1',y_2',y_3',)+1. \quad (5)$$

The function max( ) selects a maximum value from its operand, and the function min( ) selects a minimum from its operand. Knowing positions of the control points of the current block 310, v therefore describes positions of the control points of the transformed block 320. If v is fractional, then v points to a sub-sample location that does not exist in a reference frame. In that case, the encoder 130 generates the sub-sample location using an interpolation filter with integer samples as inputs, and T' is a length of the interpolation filter for affine modes and is equal to a number of the integer samples. For instance, T' is 2, 4, or 8. Finally, a memory bandwidth MB needed to encode the current block 310 may be represented as follows:

$$MB=(w'+T'-1)*(h'+T'-1). \quad (6)$$

w', T', and h' are as described above.

Figure 4:
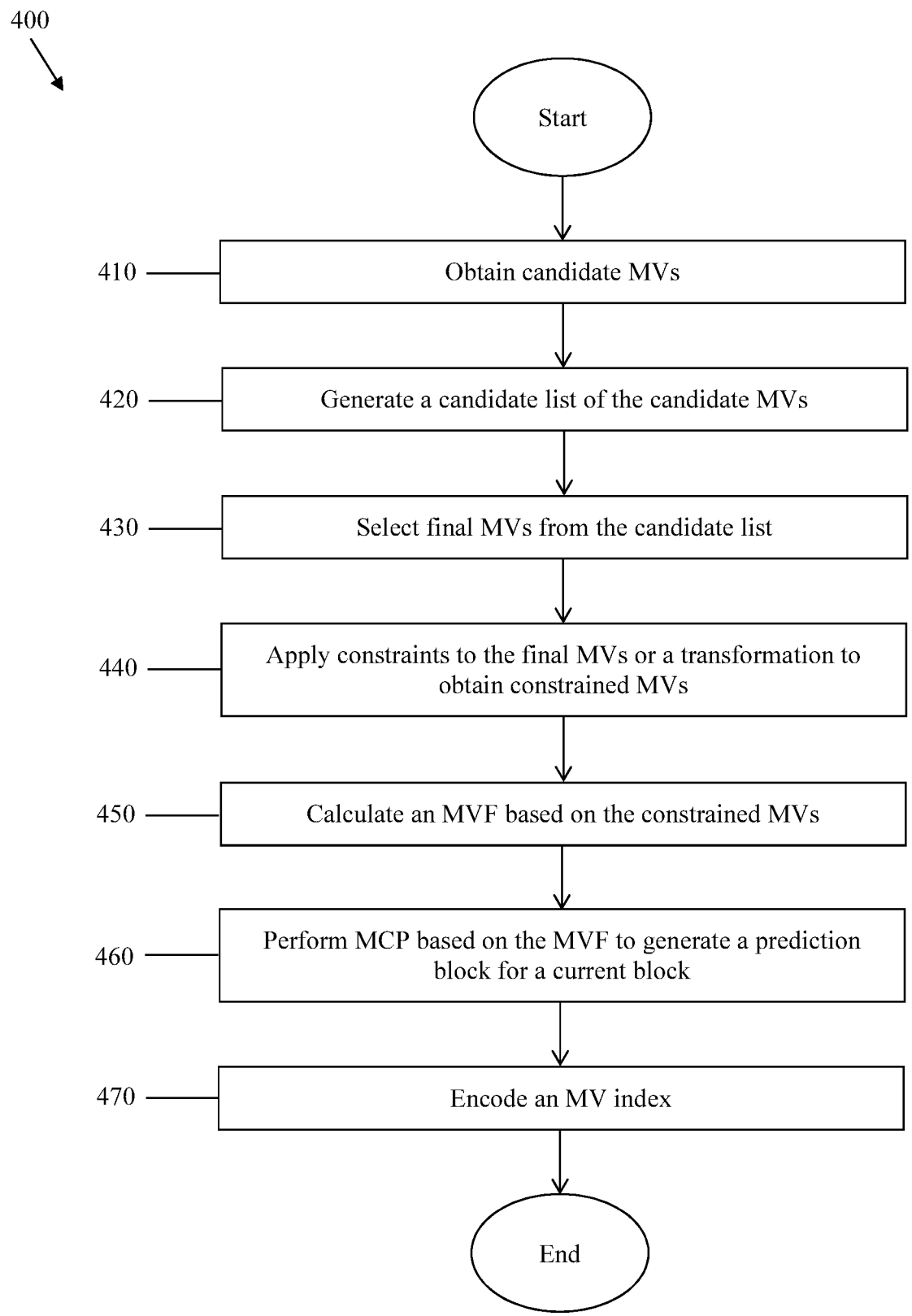
FIG. 4 is a flowchart illustrating a method of encoding according to an embodiment of the disclosure.

FIG. 4 is a flowchart illustrating a method 400 of encoding according to an embodiment of the disclosure. The encoder 130 may perform the method 400 when performing either AF_inter or AF_merge. At step 410, candidate MVs are obtained. In inter prediction, the encoder 130 obtains candidate MVs from the MVs of the NBs 220-280, which are already known when the encoder 130 is encoding the current block 210. Specifically, for AF_inter, the encoder 130 considers the MVs from the NBs 250, 260, 240 in that order as candidate MVs for $v_0$, and the encoder 130 considers the MVs from the NBs 270, 280 in that order as candidate MVs for $v_1$. For AF_merge, the encoder 130 considers the MVs from the NBs 230, 270, 280, 220, 250 in that order for $v_0$ and $v_1$.

At step 420, a candidate list of the candidate MVs is generated. To do so, the encoder 130 applies known rules. For instance, the encoder 130 removes duplicate candidate MVs and fills unused candidate list slots with zero MVs.

At step 430, final MVs are selected from the candidate list. The encoder 130 selects a final MV for both $v_0$ and $v_1$ for an affine model with two control points and four parameters; $v_0$, $v_1$, and $v_2$ for an affine model with three control points and six parameters; or $v_0$, $v_1$, $v_2$, and $v_3$ for an affine model with four control points and eight parameters. To do so, the encoder 130 applies known rules. For instance, the encoder applies a rate distortion cost check. For AF_inter, the encoder 130 may also perform motion estimation to obtain the final MVs.

At step 440, constraints are applied to the final MVs or to a transformation to obtain constrained MVs. The encoder 130 directly constrains the final MVs using one set of the MV constraints described below, or the encoder 130 indirectly constrains the final MVs by constraining a transformation using one set of the transformation constraints described below. By applying the constraints, the encoder 130 calculates a combination of $v_{0x}$, $v_{0y}$, $v_{1x}$, $v_{1y}$, $v_{2x}$, $v_{2y}$, $v_{3x}$, and $v_{3y}$, depending on which affine model the encoder 130 uses, when constraining the final MVs, or the encoder 130 calculates w', h', and T' when constraining the transformation. Compared to the final MVs, the constrained MVs reduce a memory bandwidth. If the encoder 130 is unable to constrain the final MVs, then the encoder 130 may proceed with one of two alternatives. In a first alternative, the encoder 130 skips the remaining steps of the method 400 and implements a coding mode other than AF_inter or AF_merge. In a second alternative, the encoder 130 modifies the final MVs until the encoder 130 is able to constrain the final MVs. Alternatively, steps 410, 420, 430 may be replaced with a single step of determining MVs, and step 440 may be replaced with a step of applying constraints to the MVs or a transformation to obtain constrained MVs.

At step 450, an MVF is calculated based on the constrained MVs. The encoder 130 calculates the MVF according to equation set (1), (2), or (3). At step 460, MCP is performed based on the MVF to generate a prediction block for a current block. The prediction block comprises prediction values for each pixel of the current block 210.

Finally, at step 470, an MV index is encoded. The encoder 130 encodes the MV index as part of the encoded video described above. The MV index indicates an order of the candidate MVs in the candidate list. For AF_inter, the encoder 130 may also encode an MV difference indicating a difference between final MVs and candidate MVs.

Figure 5:
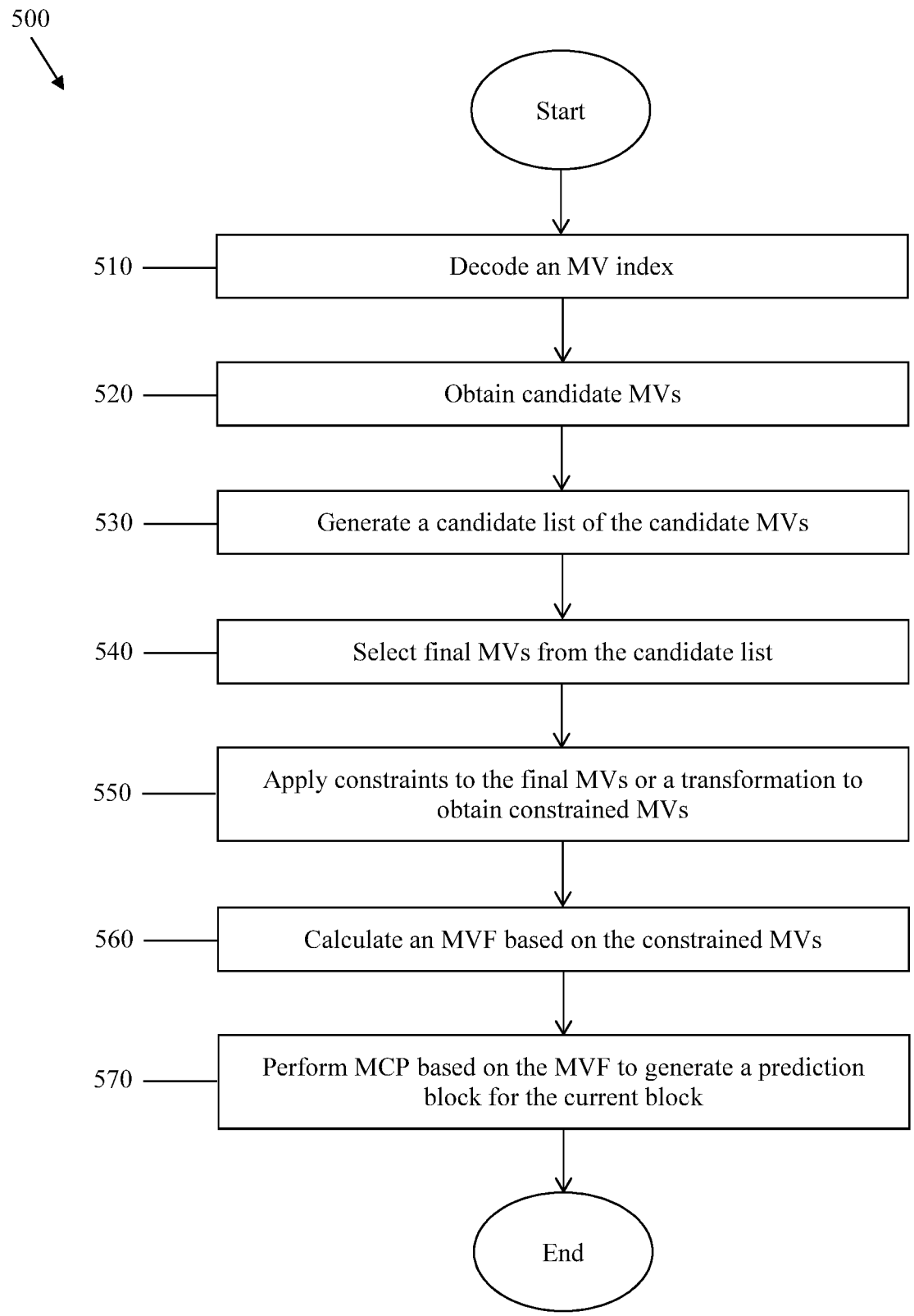
FIG. 5 is a flowchart illustrating a method of decoding according to an embodiment of the disclosure.

FIG. 5 is a flowchart illustrating a method 500 of decoding according to an embodiment of the disclosure. The decoder 180 may perform the method 500 when performing either AF_inter or AF_merge. At step 510, an MV index is decoded. The MV index may be the same index encoded at step 470 in FIG. 4. For AF_inter, the encoder 130 may also decode the MV difference. Steps 520, 530, 540, 550, 560, 570 are similar to steps 410, 420, 430, 440, 450, 460, respectively, in FIG. 4. For AF_inter, the encoder 130 may obtain the final MVs adding the MV difference to the candidate MVs. Alternatively, steps 520, 530, 540 may be replaced with a single step of determining MVs, and step 550 may be replaced with a step of applying constraints to the MVs or a transformation to obtain constrained MVs.

Figure 6:
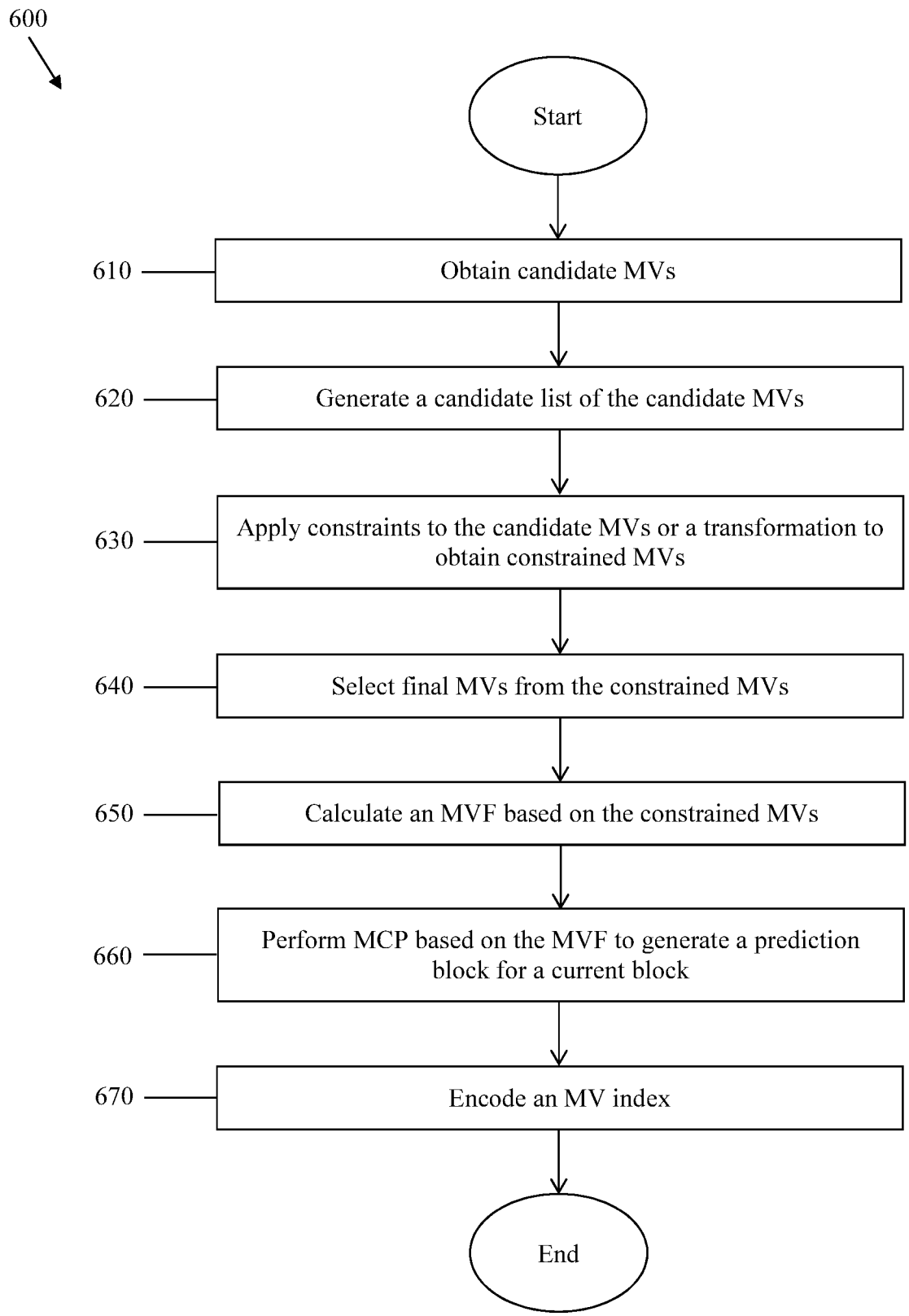
FIG. 6 is a flowchart illustrating a method of encoding according to another embodiment of the disclosure.

FIG. 6 is a flowchart illustrating a method 600 of encoding according to another embodiment of the disclosure. The encoder 130 may perform the method 600 when performing AF_merge. The method 600 is similar to the method 400 in FIG. 4. Specifically, steps 610, 620, 650, 660, 670 in FIG. 6 are similar to steps 410, 420, 450, 460, 470, respectively, in FIG. 4. However, compared to steps 430, 440, steps 630, 640 are reversed. In addition, instead of applying to both AF_inter and AF_merge like the method 400, the method 600 applies to AF_merge.

Figure 7:
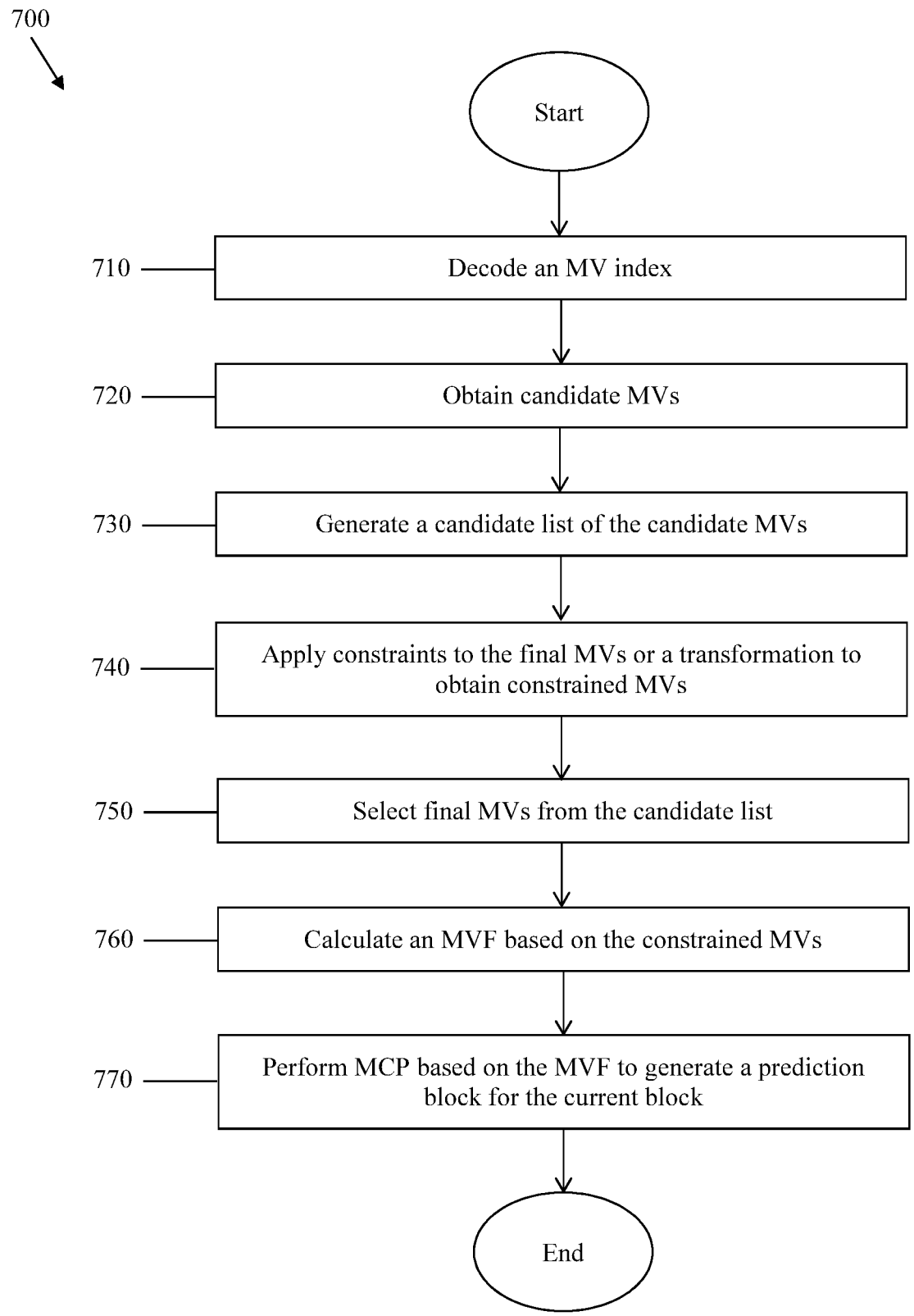
FIG. 7 is a flowchart illustrating a method of decoding according to another embodiment of the disclosure.

FIG. 7 is a flowchart illustrating a method 700 of decoding according to another embodiment of the disclosure. The decoder 180 may perform the method 700 when performing AF_merge. At step 710, an MV index is decoded. The MV index may be the same index encoded at step 670 in FIG. 6. Steps 720, 730, 740, 750, 760, 770 are similar to steps 610, 620, 630, 640, 650, 660, respectively, in FIG. 6.

MV Constraint

In a first embodiment of MV constraint, using two control points, the encoder 130 applies the following MV constraints to the preliminary MVs:

$$|v_{1x}-v_{0x}|\le w*TH$$

$$|v_{1y}-v_{0y}|\le h*TH. \quad (7)$$

$v_{1x}$, $v_{0x}$, w, $v_{1y}$, and $v_{0y}$ are as described above; TH is a threshold; and h is a height of the current block 210 in a number of pixels, for instance 8 pixels. TH is an arbitrary number suitable for providing adequate MCP, yet suitable for reducing a memory bandwidth. For instance, if the current block 310 transforms to the transformed block 320 using only a scaling transformation and if a maximum scaling factor is 2, then $|v_{1x}-v_{0x}+w$, which is a width of the transformed block 320, should be no larger than 2*w and TH should be set to 1. The encoder 130 and the decoder 180 store TH as a static default. Alternatively, the encoder 130 dynamically signals TH to the decoder 180 in SPSs, PPSs, slice headers, or another suitable form.

In a second embodiment of MV constraint, using three control points, the encoder 130 applies the following MV constraints to the preliminary MVs:

$$|v_{1x}-v_{0x}| \le w*TH$$

$$|v_{1y}-v_{0y}| \le h*TH$$

$$|v_{2x}-v_{0x}| \le w*TH$$

$$|v_{2y}-v_{0y}| \le h*TH. \quad (8)$$

$v_{1x}$, $v_{0x}$, w, TH, $v_{1y}$, $v_{0y}$, and h are as described above; $v_{2x}$ is a horizontal component of a third control point MV; and $v_{2y}$ is a vertical component of the third control point MV. The third control point is in any suitable location of the current block 210, for instance in the center of the current block 210.

In a third embodiment of MV constraint, using two control points, the encoder 130 applies the following MV constraints to the preliminary MVs:

$$\sqrt{(|v_{1x}-v_{0x}|+w)^2+|v_{1y}-v_{0y}|^2} \le w*TH. \quad (9)$$

$v_{1x}$, $v_{0x}$, w, $v_{1y}$, $v_{0y}$, and TH are as described above.

In a fourth embodiment of MV constraint, using three control points, the encoder 130 applies the following MV constraints to the preliminary MVs:

$$\sqrt{(|v_{1x}-v_{0x}|+w)^2+|v_{1y}-v_{0y}|^2} \le w*TH$$

$$\sqrt{(\uparrow v_{2y}-v_{0y}|+h)^2+|v_{2x}-v_{0x}|^2} \le h*TH. \quad (10)$$

$v_{1x}$, $v_{0x}$, w, $v_{1y}$, $v_{0y}$, TH, $v_{2y}$, h, and $v_{2x}$ are as described above.

Transformation Constraint

In a first embodiment of transformation constraint, the encoder 130 applies the following transformation constraint:

$$(w'+T'-1)*(h'+T'-1) \le TH*w*h. \quad (11)$$

w', T', h', w, and h are as described above. TH is an arbitrary number suitable for providing adequate MCP, yet suitable for a reducing a memory bandwidth. For instance, if a maximum memory bandwidth of a sample is defined as a memory access consumption of a 4×4 block, then TH is as follows:

$$TH = \frac{(4+T-1)*(4+T-1)}{4*4}. \quad (12)$$

T is a length of an interpolation filter for translation modes. The encoder 130 and the decoder 180 store TH as a static default. Alternatively, the encoder 130 dynamically signals TH to the decoder 180 in SPSs, PPSs, slice headers, or another suitable form.

In a second embodiment of transformation constraint, the encoder 130 applies the following transformation constraint when using uni-prediction:

$$(w'+T'-1)*(h'+T'-1) \le TH_{UNI}*w*h. \quad (13)$$

Uni-prediction means the encoder 130 determines prediction values of the current block 210 using one reference block.

w', T', h', w, and h are as described above. $TH_{UNI}$ is an arbitrary number suitable for providing adequate MCP, yet suitable for reducing a memory bandwidth for uni-prediction. For instance, if a maximum memory bandwidth of a sample for uni-prediction is defined as a memory access consumption of a 4×4 block, then $TH_{UNI}$ is as follows:

$$TH_{UNI} = \frac{(4+T-1)*(4+T-1)}{4*4}. \quad (14)$$

Similarly, the encoder 130 applies the following transformation constraint when using bi-prediction:

$$(w'+T'-1)*(h'+T'-1) \le TH_{BI}*w*h. \quad (15)$$

Bi-prediction means the encoder 130 determines prediction values of the current block 210 using two reference blocks. w', T', h', w, and h are as described above. $TH_{BI}$ is an arbitrary number suitable for providing adequate MCP, yet suitable for reducing a memory bandwidth for bi-prediction. $TH_{UNI}$ is less than or equal to $TH_{BI}$. For instance, if a maximum memory bandwidth of a sample for bi-prediction is defined as a memory access consumption of an 8×4 block, then $TH_{BI}$ is as follows:

$$TH_{BI} = \frac{(8+T-1)*(4+T-1)}{8*4}. \quad (16)$$

Unlike in equation (11), the thresholds in equations (13) and (15) are specific to uni-prediction and bi-prediction, respectively.

In a third embodiment of transformation constraint, the encoder 130 uses bi-prediction so there are two memory bandwidths as follows:

$$MB_0=(w_0'+T'-1)*(h_0'+T'-1)$$

$$MB_1=(w_1'+T'-1)*(h_1'+T'-1). \quad (17)$$

$MB_0$ is a memory bandwidth for a first transformation using a first width $w_0'$ and a first height $h_0'$, and $MB_1$ is a memory bandwidth for a second transformation using a second width $w_1'$ and a second height $h_1'$. Using the two memory bandwidths, the encoder 130 applies the following transformation constraint:

$$\frac{MB_0+MB_1}{w*h} \le TH. \quad (18)$$

$MB_0$, $MB_1$, w, h, and TH are as described above.

In a fourth embodiment of transformation constraint, the encoder 130 applies the following transformation constraints:

$$w'-w \le TH$$

$$h'-h \le TH. \quad (19)$$

w', w, h', h, and TH are as described above.

In a fifth embodiment of transformation constraint, the encoder 130 determines a location of the transformed block 420 as follows:

$$(x_0',y_0')=(x_0+vx_0,y_0+vy_0)$$

$$(x_i',y_1')=(x_0+w+vx_1,y_0+vy_1)$$

$$(x_2',y_2')=(x_0+vx_2,y_0+h+vy_2)$$

$$(x_3',y_3')=(x_0+w+vx_3,y_0+h+vy_3). \qquad (20)$$

$x_0'$, $y_0'$, $x_0$, $v$, $y_0$, $x_1'$, $y_1'$, $w$, $x_1$, $y_1$, $x_2'$, $y_2'$, $x_2$, $h$, $y_2$, $x_3'$, $y_3'$, $x_3$, and $y_3$ are as described above. Using equation set (17) and equation set (7), the encoder 130 determines w' and h'.

In a sixth embodiment of transformation constraint, unconstrained candidate MVs are discarded. Unconstrained candidate MVs are candidate MVs that are not constrained as described above or otherwise. Thus, unconstrained candidate MVs are candidate MVs that are left in their original form.

Figure 8:
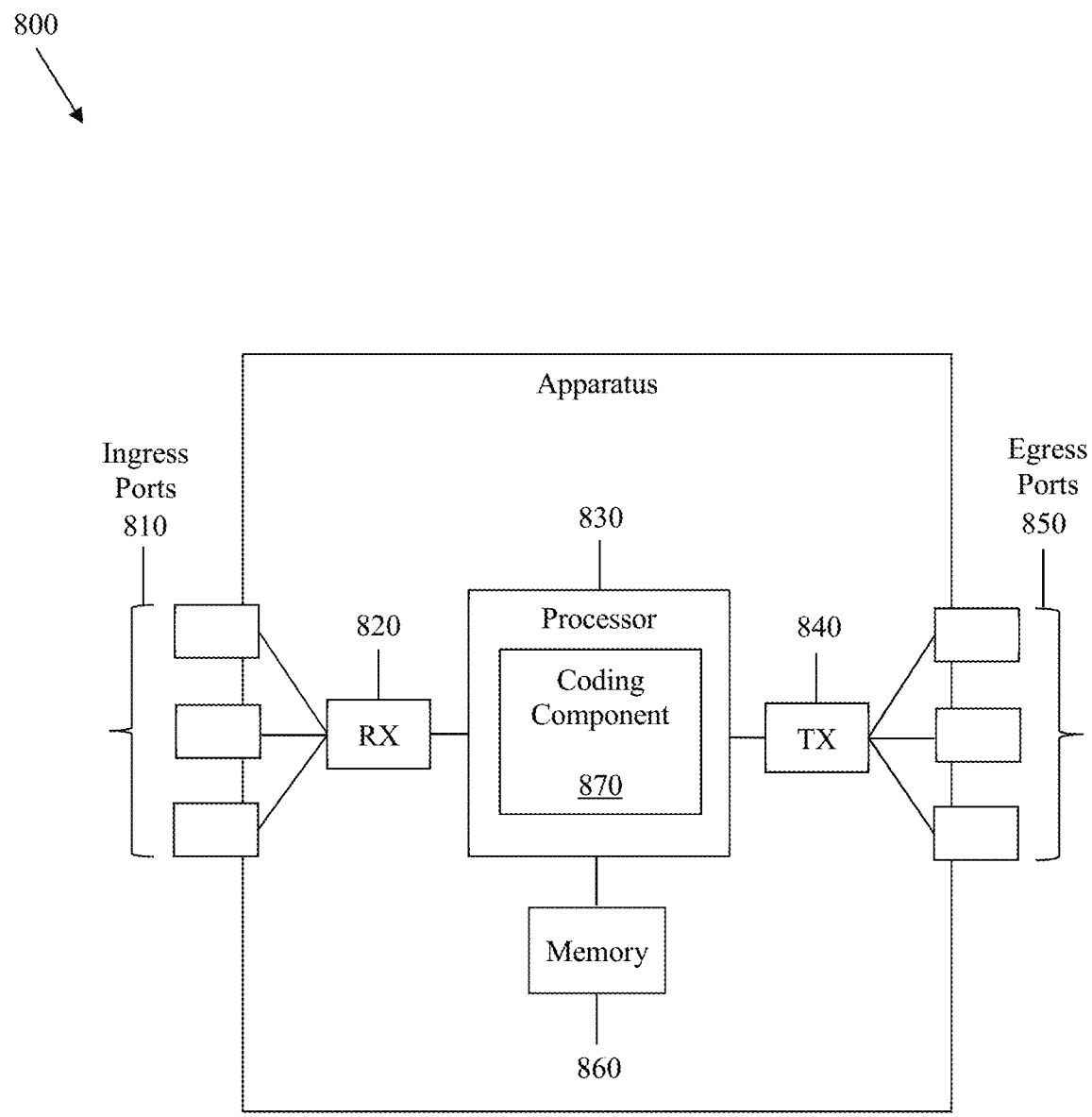
FIG. 8 is a schematic diagram of an apparatus according to an embodiment of the disclosure.

FIG. 8 is a schematic diagram of an apparatus 800 according to an embodiment of the disclosure. The apparatus 800 may implement the disclosed embodiments. The apparatus 800 comprises ingress ports 810 and an RX 820 for receiving data; a processor, logic unit, baseband unit, or CPU 830 to process the data; a TX 840 and egress ports 850 for transmitting the data; and a memory 860 for storing the data. The apparatus 800 may also comprise OE components, EO components, or RF components coupled to the ingress ports 810, the RX 820, the TX 840, and the egress ports 850 for ingress or egress of optical, electrical signals, or RF signals.

The processor 830 is any combination of hardware, middleware, firmware, or software. The processor 830 comprises any combination of one or more CPU chips, cores, FPGAs, ASICs, or DSPs. The processor 830 communicates with the ingress ports 810, the RX 820, the TX 840, the egress ports 850, and the memory 860. The processor 830 comprises a coding component 870, which implements the disclosed embodiments. The inclusion of the coding component 870 therefore provides a substantial improvement to the functionality of the apparatus 800 and effects a transformation of the apparatus 800 to a different state. Alternatively, the memory 860 stores the coding component 870 as instructions, and the processor 830 executes those instructions.

The memory 860 comprises any combination of disks, tape drives, or solid-state drives. The apparatus 800 may use the memory 860 as an over-flow data storage device to store programs when the apparatus 800 selects those programs for execution and to store instructions and data that the apparatus 800 reads during execution of those programs. The memory 860 may be volatile or non-volatile and may be any combination of ROM, RAM, TCAM, or SRAM.

In an example embodiment, an apparatus comprises: a memory element; and a processor element coupled to the memory element and configured to: obtain candidate MVs corresponding to neighboring blocks that neighbor a current block in a video frame, generate a candidate list of the candidate MVs, select final MVs from the candidate list, and apply constraints to the final MVs or a transformation to obtain constrained MVs.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a memory; and
a processor coupled to the memory and configured to:
obtain candidate motion vectors (MVs) corresponding to neighboring blocks that neighbor a current block in a video frame,
generate a candidate list of the candidate MVs,
select final MVs from the candidate list, and
apply constraints to the final MVs or a transformation to obtain constrained MVs,
wherein the constraints comprise an expression,
wherein the expression comprises a threshold and at least one of a width of the current block or a height of the current block,
wherein the threshold is an arbitrary number that is statically stored or dynamically signaled,
wherein the constraints provide that a first square root of a first quantity is less than or equal to a second quantity,
wherein the first quantity is based on a first final MV, a second final MV, a third final MV, a fourth final MV, and the width, and
wherein the second quantity is based on the width and the threshold.

2. The apparatus of claim 1, wherein the constraints provide that a first absolute value of a first difference between a first final MV and a second final MV is less than or equal to a first quantity based on the width and the threshold, and wherein the constraints further provide that a second absolute value of a second difference between a third final MV and a fourth final MV is less than or equal to a second quantity based on the height and the threshold.

3. The apparatus of claim 1, wherein the constraints further provide that a second square root of a third quantity is less than or equal to a fourth quantity, wherein the third quantity is based on a fifth final MV, a sixth final MV, a seventh final MV, an eighth final MV, and the height, and wherein the fourth quantity is based on the height and the threshold.

4. The apparatus of claim 1, wherein the constraints provide that a first quantity is less than or equal to a second quantity, wherein the first quantity is based on a first width of a transformed block, a length of an interpolation filter, and a first height of the transformed block, and wherein the second quantity is based on the threshold, the width, and the height.

5. The apparatus of claim 4, wherein the threshold is specific to uni-prediction or bi-prediction.

6. The apparatus of claim 1, wherein the constraints provide that a quantity is less than or equal to the threshold, wherein the quantity is directly proportional to a first memory bandwidth and a second memory bandwidth, and wherein the quantity is indirectly proportional to the width and the height.

7. The apparatus of claim 1, wherein the constraints provide that a first difference between a first width of a transformed block and the width is less than or equal to the threshold, and wherein the constraints further provide that a second difference between a first height of the transformed block and the height is less than or equal to the threshold.

8. The apparatus of claim 1, wherein the processor is further configured to:
calculate a motion vector field (MVF) based on the constrained MVs;
perform motion compensation prediction (MCP) based on the MVF to generate a prediction block for the current block; and
encode an MV index.

9. The apparatus of claim 1, wherein the processor is further configured to:
decode an MV index;
calculate a motion vector field (MVF) based on the constrained MVs; and
perform motion compensation prediction (MCP) based on the MVF to generate a prediction block for the current block.

10. A method comprising:
obtaining candidate motion vectors (MVs) corresponding to neighboring blocks that neighbor a current block in a video frame;
generating a candidate list of the candidate MVs;
selecting final MVs from the candidate list; and
applying constraints to the final MVs or a transformation to obtain constrained MVs,
wherein the constraints comprise an expression,
wherein the expression comprises a threshold and at least one of a width of the current block or a height of the current block,
wherein the threshold is an arbitrary number that is statically stored or dynamically signaled,
wherein the constraints provide that a quantity is less than or equal to the threshold,
wherein the quantity is directly proportional to a first memory bandwidth and a second memory bandwidth, and
wherein the quantity is indirectly proportional to the width and the height.

11. An apparatus comprising:
a memory; and
a processor coupled to the memory and configured to:
obtain candidate motion vectors (MVs) corresponding to neighboring blocks that neighbor a current block in a video frame,
generate a candidate list of the candidate MVs,
apply constraints to the candidate MVs or a transformation to obtain constrained MVs, wherein the constraints comprise an expression, wherein the expression comprises a threshold and at least one of a width of the current block or a height of the current block, wherein the threshold is an arbitrary number that is statically stored or dynamically signaled, wherein the constraints provide that a first square root of a first quantity is less than or equal to a second quantity, wherein the first quantity is based on a first final MV, a second final MV, a third final MV, a fourth final MV, and the width, and wherein the second quantity is based on the width and the threshold, and
select final MVs from the constrained MVs.

12. The apparatus of claim 11, wherein the constraints provide that a first absolute value of a first difference between a first final MV and a second final MV is less than or equal to a first quantity based on the width and the threshold, and wherein the constraints further provide that a second absolute value of a second difference between a third final MV and a fourth final MV is less than or equal to a second quantity based on the height and the threshold.

13. The apparatus of claim 11, wherein the constraints further provide that a second square root of a third quantity is less than or equal to a fourth quantity, wherein the third quantity is based on a fifth final MV, a sixth final MV, a seventh final MV, an eighth final MV, and the height, and wherein the fourth quantity is based on the height and the threshold.

14. The apparatus of claim 11, wherein the constraints provide that a first quantity is less than or equal to a second quantity, wherein the first quantity is based on a first width of a transformed block, a length of an interpolation filter, and a first height of the transformed block, and wherein the second quantity is based on the threshold, the width, and the height.

15. The apparatus of claim 11, wherein the constraints provide that a quantity is less than or equal to the threshold, wherein the quantity is directly proportional to a first memory bandwidth and a second memory bandwidth, and wherein the quantity is indirectly proportional to the width and the height.

16. The apparatus of claim 11, wherein the constraints provide that a first difference between a first width of a transformed block and the width is less than or equal to the threshold, and wherein the constraints further provide that a second difference between a first height of the transformed block and the height is less than or equal to the threshold.

17. The apparatus of claim 11, wherein the processor is further configured to:
calculate a motion vector field (MVF) based on the constrained MVs;
perform motion compensation prediction (MCP) based on the MVF to generate a prediction block for the current block; and
encode an MV index.

18. The apparatus of claim 11, wherein the processor is further configured to:
decode an MV index;
calculate a motion vector field (MVF) based on the constrained MVs; and
perform motion compensation prediction (MCP) based on the MVF to generate a prediction block for the current block.

* * * * *